(12) United States Patent
Itano et al.

(10) Patent No.: US 10,044,964 B2
(45) Date of Patent: Aug. 7, 2018

(54) COLUMN SIGNAL PROCESSING UNIT WITH DRIVING METHOD FOR PHOTOELECTRIC CONVERSION APPARATUS, PHOTOELECTRIC CONVERSION APPARATUS, AND IMAGE PICKUP SYSTEM

(71) Applicant: CANON KABUSHIKI KAISHA, Tokyo (JP)

(72) Inventors: Tetsuya Itano, Sagamihara (JP); Kazuo Yamazaki, Yokohama (JP); Kohichi Nakamura, Kawasaki (JP); Koichiro Iwata, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 320 days.

(21) Appl. No.: 14/569,510

(22) Filed: Dec. 12, 2014

(65) Prior Publication Data
US 2015/0172581 A1 Jun. 18, 2015

(30) Foreign Application Priority Data
Dec. 18, 2013 (JP) ................................ 2013-261505

(51) Int. Cl.
*H04N 5/378* (2011.01)
*H04N 5/3745* (2011.01)

(52) U.S. Cl.
CPC ......... *H04N 5/378* (2013.01); *H04N 5/37455* (2013.01)

(58) Field of Classification Search
CPC . H01L 27/146; H01L 27/14601; H04N 5/378; H04N 5/37455; H04N 5/357; H04N 5/3575; H04N 5/374
(Continued)

(56) References Cited

U.S. PATENT DOCUMENTS

| 5,892,540 A * | 4/1999 | Kozlowski ........... H04N 5/3658 250/208.1 |
| 2008/0036891 A1* | 2/2008 | Ono ..................... H04N 5/3598 348/308 |

(Continued)

FOREIGN PATENT DOCUMENTS

| JP | 2009-010787 A | 1/2009 |
| JP | 2010-034616 A | 2/2010 |

(Continued)

*Primary Examiner* — Que T Le
*Assistant Examiner* — Jennifer Bennett
(74) *Attorney, Agent, or Firm* — Canon U.S.A., Inc. IP Division

(57) ABSTRACT

First processing of causing a hold unit to hold a first signal from an amplification unit based on reset of the amplification unit, second processing of performing AD conversion of the held first signal and outputting a second signal obtained by superposing a signal based on charges generated in a photoelectric conversion unit of a first-row pixel on the first signal, third processing of performing an operation of performing AD conversion of the held second signal and an operation of resetting the amplification unit at least partly in parallel, and fourth processing of causing the hold unit to hold a fourth signal obtained by superposing a signal based on charges generated in the photoelectric conversion unit of a second-row pixel on a third signal from the amplification unit based on resetting of the amplification unit and is output from the amplification unit are performed.

17 Claims, 9 Drawing Sheets

(58) Field of Classification Search
USPC .... 250/208.1, 214 R, 214.1, 214 A; 348/294
See application file for complete search history.

(56) References Cited

U.S. PATENT DOCUMENTS

| | | | | |
|---|---|---|---|---|
| 2013/0070136 A1* | 3/2013 | Hiyama | .............. | H03M 1/1225 |
| | | | | 348/300 |
| 2013/0107092 A1* | 5/2013 | Minami | ................... | H04N 5/32 |
| | | | | 348/301 |

FOREIGN PATENT DOCUMENTS

| | | |
|---|---|---|
| JP | 2013-138328 A | 7/2013 |
| JP | 2013-179479 A | 9/2013 |
| WO | 2007/122665 A1 | 11/2007 |

\* cited by examiner

COLUMN SIGNAL PROCESSING UNIT WITH DRIVING METHOD FOR PHOTOELECTRIC CONVERSION APPARATUS, PHOTOELECTRIC CONVERSION APPARATUS, AND IMAGE PICKUP SYSTEM

BACKGROUND OF THE INVENTION

Field of the Invention

The present invention relates to a driving method for a photoelectric conversion apparatus, a photoelectric conversion apparatus, and an image pickup system.

Description of the Related Art

It is known that an analog-to-digital (AD) converter is provided for each column of a pixel array in a solid-state image pickup apparatus. Japanese Patent Laid-Open No. 2009-10787 describes a configuration in which a signal holding switch and a signal holding capacitance directly connected to the AD converter are provided upstream of the AD converter provided in each column of the pixel array. According to Japanese Patent Laid-Open No. 2009-10787, a read operation for an analog signal from a pixel, and an AD conversion operation thereof are performed in parallel by turning off the signal holding switch during an AD conversion period for the analog signal held in the signal holding switch, so that high-speed reading can be realized.

Japanese Patent Laid-Open No. 2009-10787 further describes a provision of an amplifier called column amplifier upstream of the signal holding switch.

SUMMARY OF THE INVENTION

A driving method for a photoelectric conversion apparatus that includes a pixel array in which a plurality of pixels are arranged in a matrix, each of the pixels including a photoelectric conversion unit, and a plurality of column signal processing units provided in correspondence with respective columns of the pixel array, each column signal processing unit including an amplification unit configured to amplify a signal output from the pixel, and a hold unit configured to hold a signal output from the amplification unit, the method including:

first processing of causing, in a case where signals are sequentially read out from the pixels in first and second rows included in the pixel array, the hold unit to hold a first signal output from the amplification unit based on a situation where the amplification unit is reset;

second processing of performing AD conversion of the first signal after the first processing and outputting a second signal that is obtained by superposing a signal based on charges generated in the photoelectric conversion unit of the pixel in the first row on the first signal from the amplification unit;

third processing of performing an operation of performing, after the second signal is held in the hold unit, AD conversion of the second signal and an operation of resetting the amplification unit after the second signal is output from the amplification unit, at least partly in parallel; and fourth processing of causing the hold unit to hold a fourth signal that is obtained by superposing a signal based on charges generated in the photoelectric conversion unit of the pixel in the second row on a third signal output from the amplification unit based on a situation where the amplification unit is reset in the third processing and is output from the amplification unit.

Further features of the present invention will become apparent from the following description of exemplary embodiments with reference to the attached drawings.

DESCRIPTION OF THE EMBODIMENTS

However, Japanese Patent Laid-Open No. 2009-10787 does not describe an operation of resetting a column amplifier. The study has not been sufficiently done in terms of a risk of a decrease in a signal reading speed if a column amplifier is not reset in an appropriate period.

Hereinafter, a technology for realizing a further increase in the signal reading speed will be described.

EMBODIMENTS

With reference to the drawings, embodiments of the present invention will be described.

First Embodiment

Figure 1:
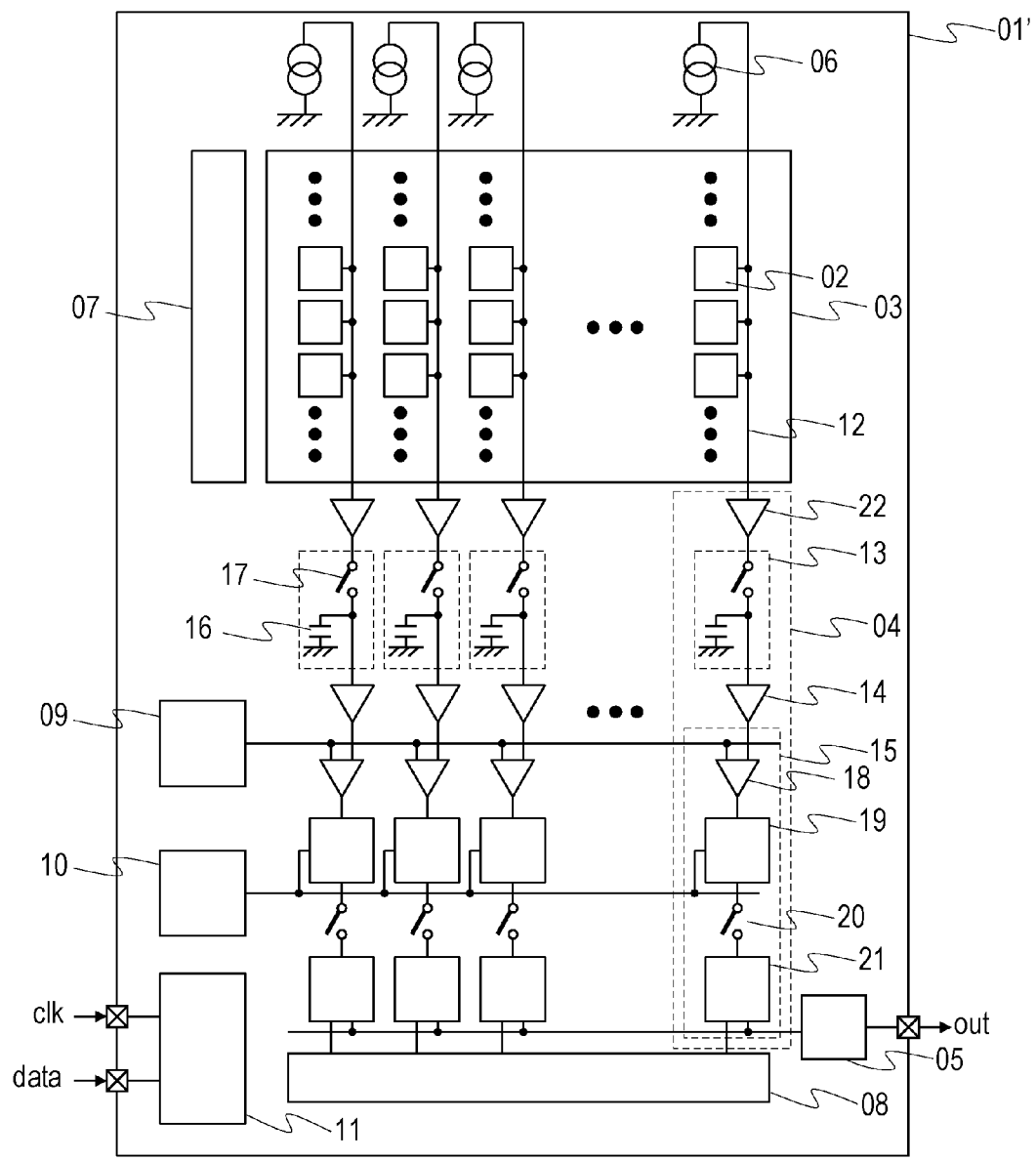
FIG. 1 is a block diagram illustrating a configuration of a photoelectric conversion apparatus.

FIG. 1 is a block diagram illustrating a configuration of a photoelectric conversion apparatus. A photoelectric conversion apparatus 01 according to a first embodiment includes a pixel array 03 in which a plurality of pixels 02 are arranged in a matrix, column signal processing units 04, a data output unit 05, and load current sources 06. The photoelectric conversion apparatus 01 further includes a vertical scanning unit 07 that controls operations of the pixels 02 in units of rows, a horizontal scanning unit 08, a reference signal generation unit 09, a count unit 10, and a control unit 11. The pixels 02 in each column are connected to the column signal processing unit 04 and the load current source 06 via a pixel output line 12. Each of the column signal processing units 04 includes a column amplifier 22, a sample-and-hold unit 13, a buffer unit 14, and an analog-to-digital (AD) conversion unit 15.

The control unit 11 receives a clock signal "clk" and communication data "data" from outside of the apparatus and controls operations of the respective blocks included in the photoelectric conversion apparatus 01.

Figure 3:
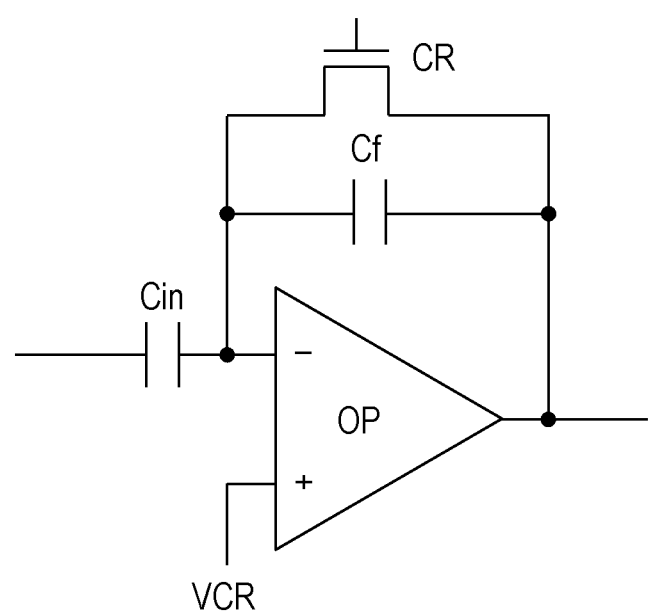
FIG. 3 is an equivalent circuit diagram illustrating a configuration of an inverting amplifier.

An amplifier that can set an amplification factor exceeding 1×, for example, can be used for the column amplifier 22 as an amplification unit. FIG. 3 is an equivalent circuit diagram of an inverting amplifier circuit using a differential amplifier as an example of the configuration of the column amplifier 22. An operation amplifier, for example, can be used for the differential amplifier.

The sample-and-hold unit 13 includes a capacitor element 16 and a switch 17, and when the switch 17 is switched from on to off, a signal appearing on the pixel output line 12 is held in the capacitor element 16. The capacitor element 16 is connected to the AD conversion unit 15 via the buffer unit 14.

The AD conversion unit 15 includes a comparison unit 18, a write memory 19, an inter-memory transfer switch 20, and a read memory 21. The comparison unit 18 receives a reference signal supplied from the reference signal generation unit 09 and an output of the buffer unit 14 as input signals, and when a relationship of magnitude between those input signals is reversed, a logic level of an output of the comparison unit 18 is reversed. When the logic level of the output of the comparison unit 18 is reversed, the write memory 19 holds a count signal supplied from the count unit 10. The count signal held in the write memory 19 is transferred to the read memory 21 via the inter-memory transfer switch 20. When the signal held in the read memory 21 is selected by the horizontal scanning unit 08, the signal is transmitted to the data output unit 05. According to the present embodiment, each of the write memory 19 and the read memory 21 has a configuration in which two pieces of digital data can be held independently.

Figure 2:
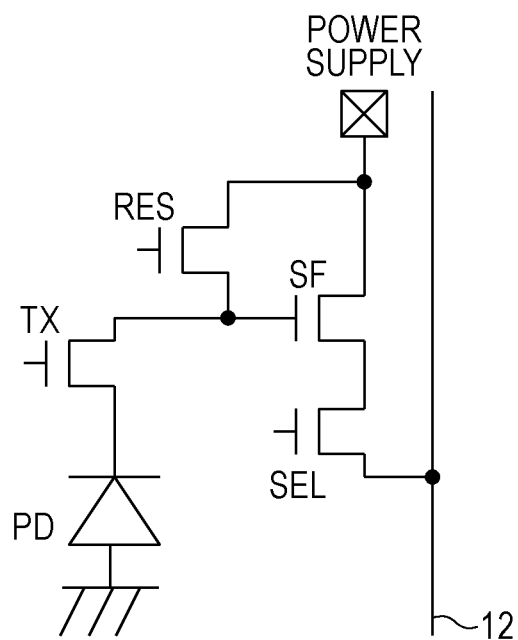
FIG. 2 is an equivalent circuit diagram illustrating a configuration of a pixel.

FIG. 2 is an equivalent circuit diagram for describing a configuration example of the pixel 02. The pixel 02 includes a photodiode PD as a photoelectric conversion unit, a transfer transistor TX, a source follower transistor SF, a reset transistor RES, and a selection transistor SEL.
Charges generated through a photoelectric conversion by the photodiode PD are transferred to a gate node of the source follower transistor SF via the transfer transistor TX. When the selection transistor SEL is turned on, the source follower transistor SF functions as a source follower circuit together with the load current source 06, and an output in accordance with the charge amount transferred to the gate node appears on the pixel output line 12. When the reset transistor RES is turned on, the reset transistor RES resets the gate node of the source follower transistor SF to a power supply voltage.

FIG. 3 is an equivalent circuit diagram illustrating an example of the configuration of the column amplifier 22. The inverting amplifier circuit in FIG. 3 includes a differential amplifier OP, an input capacitance Cin, a feedback capacitance Cf, and a feedback switch CR. The differential amplifier OP receives a reference voltage VCR at a non-inversion input node thereof, and one node of the input capacitance Cin, one node of the feedback capacitance Cf, and one node of the feedback switch CR are connected to an inversion input node. The other node of the input capacitance Cin is connected to the pixel 02 and the load current source 06 via the pixel output line 12. The other node of the feedback capacitance Cf and the other node of the feedback switch CR are both connected to an output node of the differential amplifier OP. An output of the column amplifier 22 is connected to the switch 17. According to this configuration, the amplitude factor of the column amplifier 22 is determined by a ratio of a capacitance value of the input capacitance Cin to a capacitance value of the feedback capacitance Cf. Furthermore, according to the illustrated configuration, CDS processing for reducing the noise generated in the pixel 02 can also be performed.

In a case where the column amplifier 22 is constituted as an amplifier in which the amplitude factor is variable, the amplitude factor of the column amplifier 22 may be changed on the basis of image pickup conditions or a sensitivity that is set depending on an image pickup system.

Figure 4:
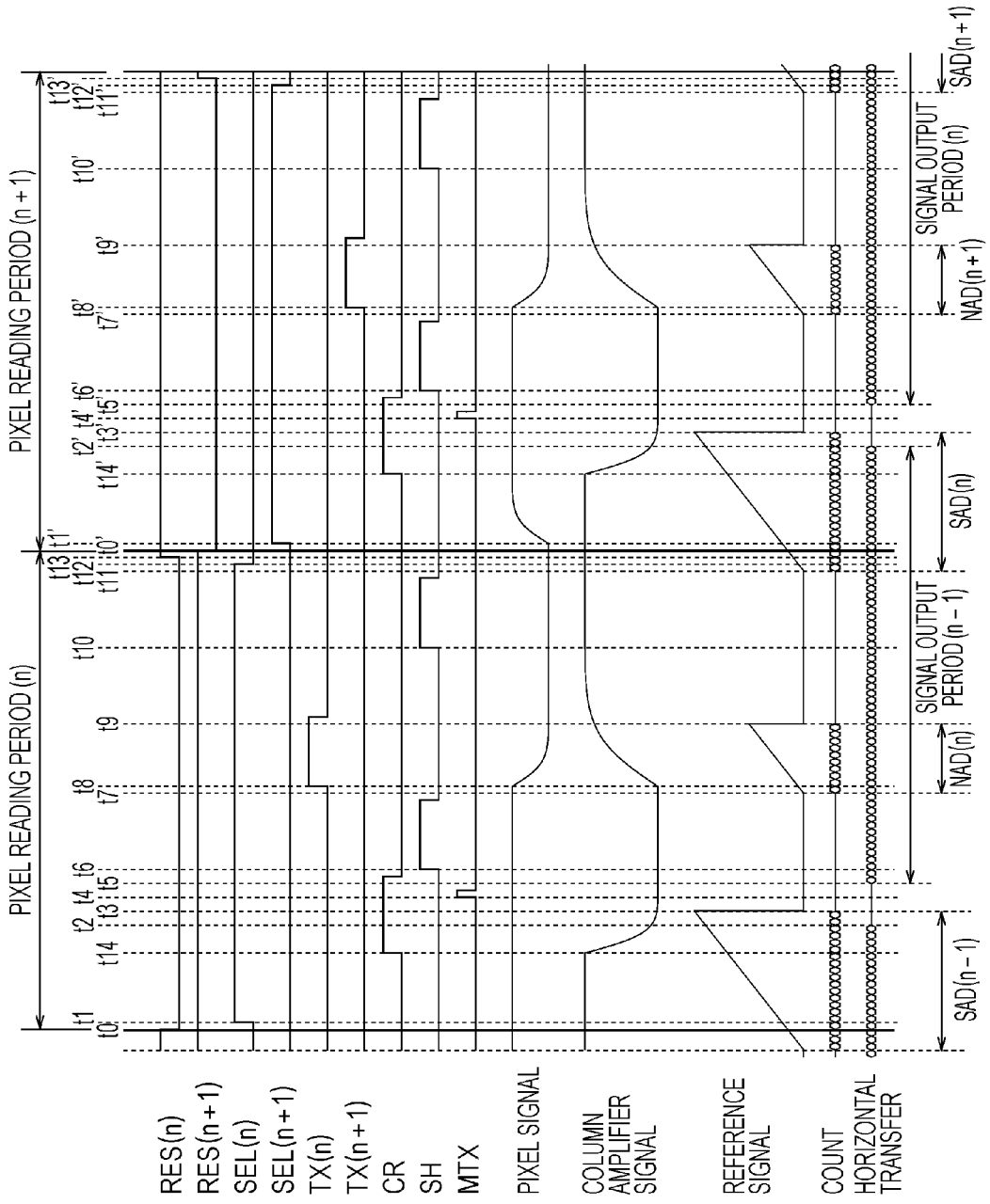
FIG. 4 is a timing chart for describing an operation by the photoelectric conversion apparatus.

Next, by further referring to FIG. 4, an operation of the photoelectric conversion apparatus 01 according to the present embodiment will be described. The following description focuses on operations relating to the pixels in an n-th row (n is an integer higher than or equal to 1) and an (n+1)-th row in the pixel array 03. A case where, while an n-th row is set as a first row and an (n+1)-th row is set as a second row, signals are sequentially read out from these rows will be described. In FIG. 4, signals RES(n), SEL(n), and TX(n) respectively indicate signals supplied to gates of the reset transistor RES, the selection transistor SEL, and the transfer transistor TX of the pixel in the n-th row. The same applies to signals RES(n+1), SEL(n+1), and TX(n+1). These signals are supplied from the vertical scanning unit 07. A signal SH is a signal for controlling a conducting state of the sample-and-hold switch 17, and a signal MTX is a signal for controlling a conducting state of the inter-memory transfer switch 20. The following description will be given based on the assumption that when the respective signals are at the high level, the corresponding transistors or switches are turned on.

According to the present embodiment, an operation example in which at least two of a sample-and-hold operation of the analog signal output from the pixel 02, an AD conversion operation, and a signal output operation from the read memory 21 are performed in parallel will be described.

A period from a time t0 to a time t0' corresponds to a period in which the analog signal related to the pixel in the n-th row is held in the capacitor element 16 (PIXEL READING PERIOD (n) in FIG. 4).

At the time t0, since the signal RES(n) is switched from the high level to the low level, the reset transistor RES of the pixel in the n-th row is turned off. Accordingly, a reset state of the source follower transistor SF is cancelled.

When the signal SEL(n) turns to the high level at a time t1, the selection transistor SEL of the pixel in the n-th row is turned on, and a signal corresponding to the reset of the gate node of the source follower transistor SF of the pixel in the n-th row appears on the pixel output line 12. This output contains noise generated when the reset transistor RES is turned off and noise derived from the source follower transistor SF.

From a time t14, the signal CR temporarily turns to the high level. Accordingly, since the input and output nodes are short-circuited, the column amplifier 22 operates as a voltage follower. The column amplifier 22 is reset since the input and output nodes are short-circuited. After this, a signal output from the column amplifier 22 since the signal CR turns to the low level will be hereinafter referred to as N signal. The N signal is an offset component of the column amplifier 22.

During a period up to a time t2, a horizontal transfer operation, in which a digital signal related to the N signal of the pixel in the (n−1)-th row is transferred from the read memory 21 to the data output unit 05, is performed. In FIG. 4, the horizontal transfer operation is started at a time before the time t0, but depending on conditions such as the number of the read memories 21 or an operating frequency of the horizontal scanning unit 08, the horizontal transfer operation may be started at the time t0 or later.

A period up to a time t3 is a period in which a signal component of the pixel in the (n−1)-th row which is held in the capacitor element 16 is converted into a digital signal (a period SAD(n−1) in FIG. 4). During this period, the capacitor element 16 is electrically cut off from the pixel output line 12 by the switch 17. In response to the temporally-varying relationship of magnitude between the reference signal and the output of the buffer unit 14, when the relationship of magnitude between those is reversed, the comparison unit 18 causes the write memory 19 to hold a count value of the count unit 10 at that time. In FIG. 4, the period SAD(n−1) is started at a time before the time t0, but depending on conditions such as a resolution of the AD conversion unit 15 or the operating frequency, the period SAD(n−1) may be started at the time t0 or later.

At a time t4, the signal MTX turns to the high level, and two digital signals held in the write memory 19 during a period NAD(n−1) and the period SAD(n−1) are transferred to the read memory 21.

From a time t5 to a time t2', the horizontal transfer operation in which the digital signal obtained by the AD conversion during the period SAD(n−1) is output from the read memory 21 is performed.

From a time t6, since the signal SH temporarily turns to the high level, the N signal corresponding to the offset component of the column amplifier 22 is held in the capacitor element 16. This processing is first processing of causing the sample-and-hold unit 13 to hold the N signal.

During a period from a time t7 to a time t9, an operation of converting the N signal in the n-th row into a digital signal is performed (a period NAD(n) in FIG. 4). During the period NAD(n), since the signal SH is at the low level, the capacitor element 16 is in a state of being electrically cut off from the pixel output line 12.

From a time t8, since the signal TX(n) temporarily turns to the high level, the charges accumulated by this time in the photodiode PD of the pixel in the n-th row are transferred to the gate node of the source follower transistor SF. A potential at the pixel output line 12 fluctuates in accordance with the transferred charge amount. A signal equivalent to a sum of a signal in accordance with the charge amount generated by the photoelectric conversion in the photodiode PD and the signal output from the pixel 02 at the time t1 appears on the pixel output line 12 at this time.

When the signal appearing on the pixel output line is input to the column amplifier 22 after the signal CR turns to the low level, the signal is output from the column amplifier 22 while the noise component derived from the reset of the source follower transistor SF of the pixel in the n-th row is reduced. That is, the output of the column amplifier 22 turns to a signal obtained by superposing a component equivalent to the signal based on the charges generated in the pixel in the n-th row on the above described N signal. The output of the column amplifier 22 at this time will be hereinafter referred to as (S+N) signal.

Herein, an operation of performing an AD conversion of the N signal related to the pixel in the n-th row corresponding to a first signal and an operation of outputting a signal component based on the charges generated in the photoelectric conversion unit of the pixel in the n-th row from the column amplifier 22 as a second signal with respect to the first signal are partly performed in parallel as second processing. However, these operations do not necessarily need to be performed in parallel.

Although not illustrated in the drawing, a switch for switching a connection state between an input node of the column amplifier 22 and the pixel output line 12 may be provided, and the column amplifier 22 may be electrically cut off from the pixel output line 12 during a period including the time t8 to the time t9. Accordingly, it is possible to avoid a situation where a potential fluctuation of the pixel output line 12 derived from a transition of the signal TX(n) is input to the column amplifier 22. Furthermore, in a case where the input node of the column amplifier 22 is temporarily electrically cut off from the pixel output line 12, if a conducting state of the above described switch is not to be switched during the AD conversion period NAD(n), it is possible to avoid a situation where noise from the switching affects an AD conversion result. Accordingly, an accuracy of the AD conversion can be increased.

From a time t10, since the signal SH temporarily turns to the high level, the (S+N) signal corresponding to the second signal related to the pixel in the n-th row which is output to the pixel output line 12 is held in the capacitor element 16.

From a time t11 to a time t3', an operation of converting the (S+N) signal related to the pixel in the n-th row into a digital signal is performed (a period SAD(n) in FIG. 4). During the period SAD(n), since the signal SH is at the low level, the capacitor element 16 is in a state of being electrically cut off from the pixel output line 12.

From a time t14' during the period SAD(n) that starts from the time t11, the signal CR temporarily turns to the high level. Accordingly, since the input and output nodes of the column amplifier 22 are short-circuited, the column amplifier 22 is reset again. That is, according to the present embodiment, an operation of performing an AD conversion of the second signal and an operation of resetting the column amplifier are partly performed in parallel as third processing. It is sufficient that at least parts of these operations may be performed in parallel although these operations are not completely performed in parallel. By resetting the column amplifier, the N signal related to the (n+1)-th row is output as a third signal.

At a time t12, the signal SEL(n) turns to the low level, and the selection transistor SEL of the pixel in the n-th row is turned off.

At a time t13, the signal RES(n) turns to the high level, and causes the gate node of the source follower transistor SF of the pixel in the n-th row to be in a reset state.

After that, during a period SAD(n+1) that starts from a time t11', an operation of outputting a signal based on the charges generated in the AD conversion unit of the pixel in (n+1)-th row from the column amplifier 22 as a fourth signal with respect to the third signal is performed.

The operation during the pixel reading period (n+1) that starts from the time t0' is similar to the operation during the pixel reading period (n), and therefore a description thereof will be omitted.

The digital signals obtained during the period NAD(n) and the period SAD(n) are subjected to differential processing by the data output unit 05, or the signal processing unit which is not illustrated and which is provided downstream of the data output unit 05. Accordingly, the correlated double sampling (CDS) processing for reducing the N signal is performed.

After the column amplifier 22 is reset, if a time until the first signal output from the column amplifier 22 is held in the sample-and-hold unit 13 is long, a time until the AD conversion of the first signal is started is lengthened. Therefore, a time used for reading out the signal from the photoelectric conversion apparatus is lengthened. In contrast to this, according to the present embodiment, it is possible to increase the signal reading speed by performing the operations related to the first to fourth processings as described above.

Figure 5:
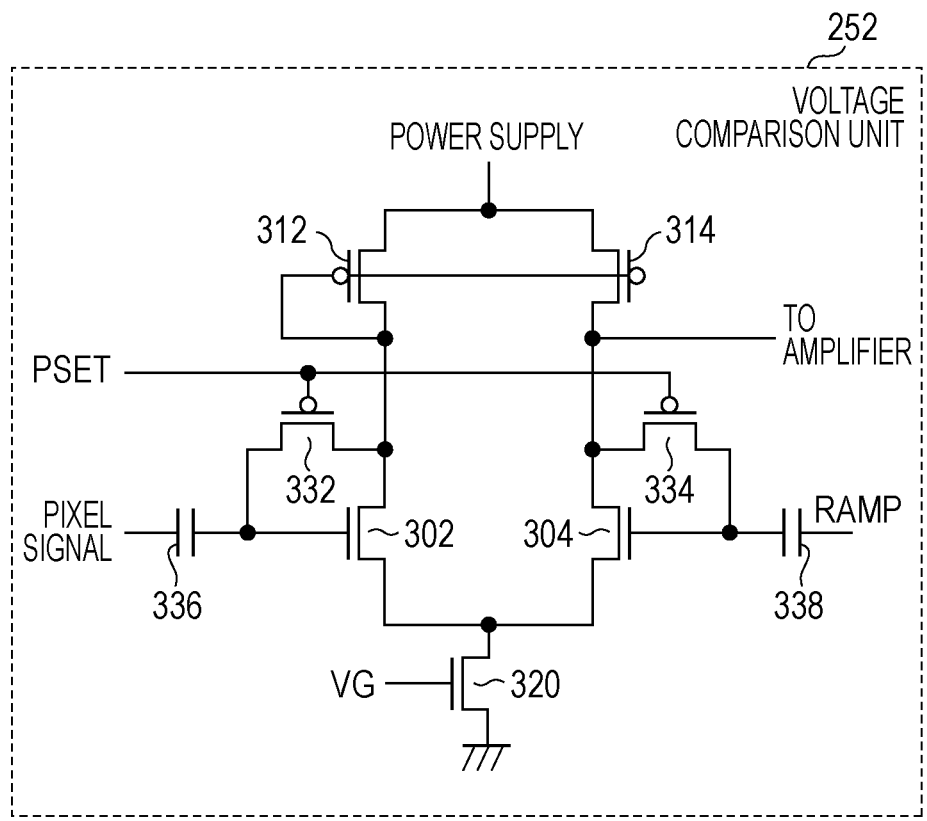
FIG. 5 is a circuit diagram of a voltage comparison unit.

FIG. 5 illustrates a circuit configuration of a voltage comparison unit 252 included in the AD converter. In this circuit, when a relationship of magnitude between a "pixel signal" and a "RAMP" corresponding to input signals to the voltage comparison unit 252 is reversed, a voltage at a drain of a transistor 314 corresponding to an output of the voltage comparison unit 252 is changed from a high level to a low level or from the low level to the high level. This change also affects a gate of the transistor 314 via a gate-drain capacitance of the transistor 314. Further, since a gate and a drain of the transistor 312 are connected to the gate of the transistor 314, the change caused in the drain of the transistor 314 also affects the gate and the drain of the transistor 312. Furthermore, since the drain of the transistor 312 is connected to a drain of a transistor 302 that is an input transistor of the voltage comparison unit 252, the change caused in the drain of the transistor 312 also affects a gate of the transistor 302. Accordingly, a phenomenon in which an output of the voltage comparison unit 252 affects the "pixel signal" corresponding to an input of voltage occurs. Since how this influence affects differs for each column, in a case where measures are not taken, there is a risk that this may turn to fixed pattern noise for each column.

In contrast to this, according to the present embodiment described above, during the AD conversion period, the capacitor element 16 is electrically cut off from the pixel array 03, and in a state in which the signal is held in the sample-and-hold unit 13, the signal held in the capacitor element 16 is supplied to the AD conversion unit 15 via the buffer unit 14. Since the buffer unit 14 is in a state of driving an input node of the comparison unit 18, it is possible to suppress a phenomenon where a transient change of the output of the comparison unit 18 fluctuates the input of the comparison unit 18, and it is possible to reduce the fixed pattern noise that may have been generated in the conventional configuration. Particularly, a capacitor element in which a reference voltage (GND in the present embodiment) is supplied to one of nodes is used, and it is therefore possible to further suppress the fixed pattern noise as compared to a case where the capacitor element connected in series to the signal path is used for the sample-and-hold unit 13.

In addition, as described above, according to the present embodiment, since the AD conversion operation and the horizontal transfer operation are performed in parallel during a period in which the analog signal is read out from the pixel in a certain row, it is possible to realize reading at a high speed.

According to the present embodiment, the fixed pattern noise is reduced, and further it is possible to realize high-speed reading.

Second Embodiment

According to the first embodiment, the configuration in which the sample-and-hold unit 13 is provided with one pair of the capacitor element 16 and the switch 17 has been described. However, the sample-and-hold unit 13 may adopt other configurations.

Figure 6:
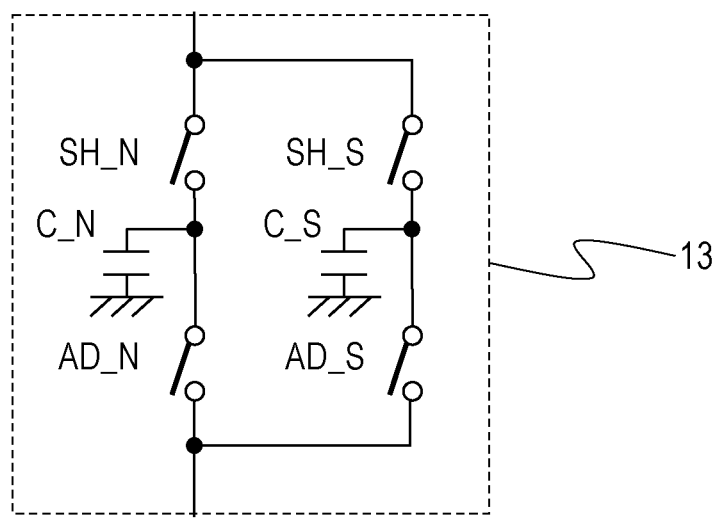
FIG. 6 is an equivalent circuit diagram illustrating a configuration of a hold unit.

FIG. 6 illustrates a configuration of the sample-and-hold unit 13 according to the present embodiment. The sample-and-hold unit 13 according to the present embodiment includes a two-system sample-and-hold circuit. A capacitor element C_N is a capacitor element configured to hold the N signal or the offset component of the column amplifier 22 as described in the above embodiment. On the other hand, a capacitor element C_S is a capacitor element configured to hold the (S+N) signal and the signal obtained by superposing the amplified S signal on the offset component of the column amplifier 22 described in the above embodiment. According to this configuration, during the period in which the AD conversion of the signal held in one of the two capacitor elements provided to the sample-and-hold unit 13 is performed, it is possible to cause the other capacitor element to hold the output of the column amplifier 22. Also in a case where the sample-and-hold unit is provided with three or more capacitor elements, the operation of converting the signal held in one capacitor element into a digital signal and the operation of causing another one of capacitor elements to hold the signal output from the pixel can be performed in parallel.

Figure 7:
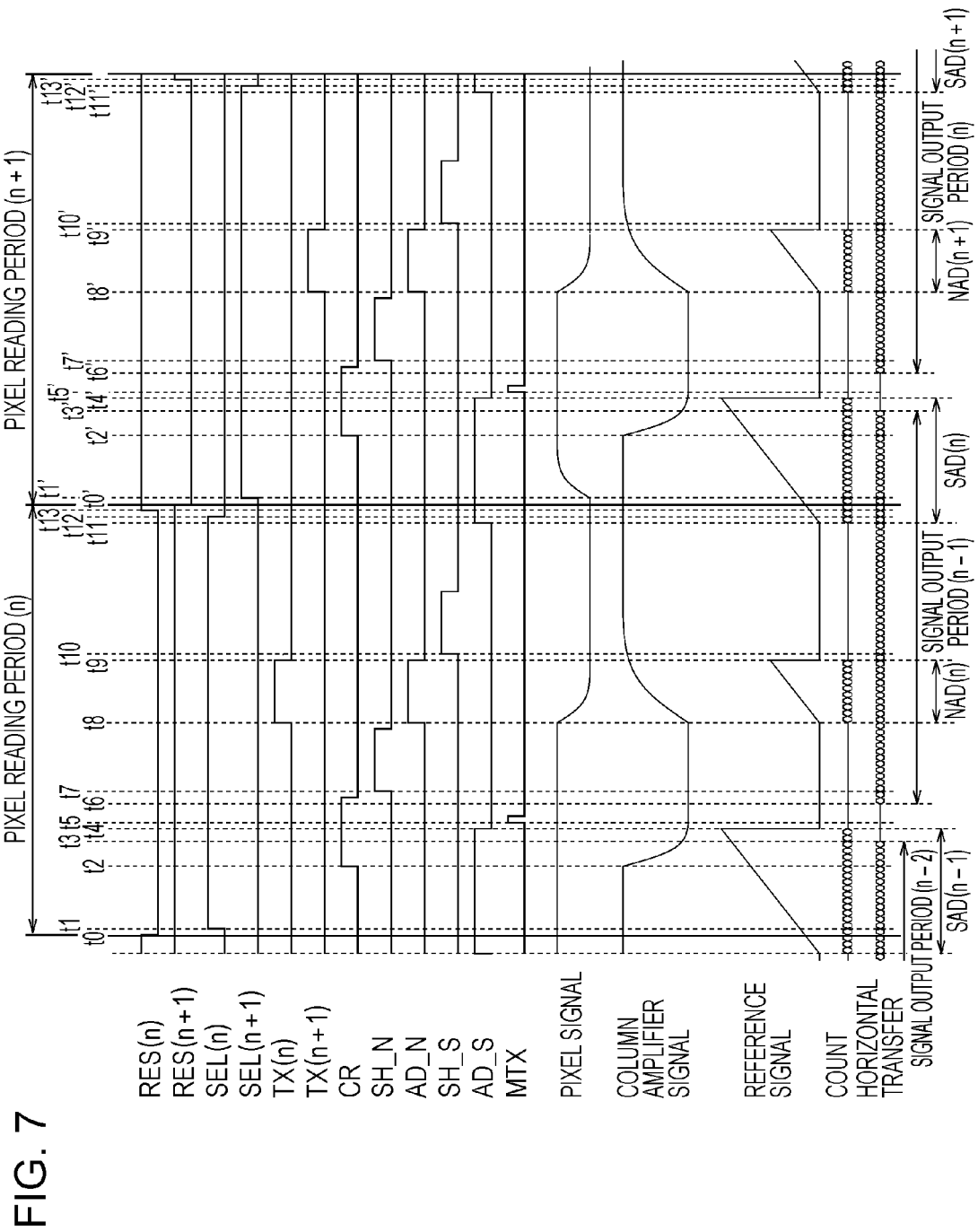
FIG. 7 is a timing chart for describing an operation by the photoelectric conversion apparatus.

FIG. 7 is a timing chart for describing an operation according to the present embodiment. Herein, a case in which the sample-and-hold unit 13 of the photoelectric conversion apparatus 01 described in the first embodiment is replaced by the configuration illustrated in FIG. 6 will be described as an example. Signals SH_N, AD_N, SH_S, and AD_S in FIG. 7 are signals for controlling the respective switches having the same reference symbols illustrated in FIG. 6, and the corresponding switch is turned on when the signal is at the high level.

From the time t0, the pixel reading period in the n-th row starts. According to the present embodiment, the time t0 is a timing within the signal output period (n−2) related to the pixel in the (n−2)-th row and within the AD conversion period SAD(n−1) related to the pixel in the (n−1)-th row. During the period SAD(n−1), the signal AD_S is at the high level so that the AD conversion of the signal held in the capacitor element C_S is performed. First, since the signal RES(n) is switched from the high level to the low level, the reset transistor RES of the pixel in the n-th row is turned off. Accordingly, the reset state of the source follower transistor SF is cancelled.

When the signal SEL(n) turns to the high level at the time t1, the selection transistor SEL of the pixel in the n-th row is turned on, and a signal corresponding to the reset of the gate node of the source follower transistor SF of the pixel in the n-th row appears on the pixel output line 12. This output contains the noise generated when the reset transistor RES is turned off and the noise derived from the source follower transistor SF. Hereinafter, this output will be referred to as N signal.

At the time t2, when the signal CR turns to the high level, the feedback switch CR of the column amplifier 22 is turned on, so that both the nodes of the feedback capacitance Cf are reset. Thereafter, when the signal CR turns to the low level, the level appearing on the pixel output line 12 at that time can be clamped in the input capacitance Cin. According to the present embodiment, the above described N signal is clamped.

At the time t3, the signal output period related to the pixel in the (n−2)-th row ends.

At the time t4, the AD conversion period SAD(n−1) related to the pixel in the (n−1)-th row ends. Along with this, the signal AD_S turns to the low level, and a switch AD_S is turned off.

At the time t5, when the signal MTX turns to the high level, the digital signals held in the write memory 19 up to this time are transferred to the read memory 21 via the inter-memory transfer switch 20. More specifically, the digital signal obtained during the period NAD(n−1) that is not illustrated and the digital signal obtained during the period SAD(n−1) are transferred.

From the time t6, the horizontal scanning unit 08 starts scanning of the read memory 21, and the signal output period with regard to the pixel in the (n−1)-th row starts.

From the time t7, when the signal SH_N temporarily turns to the high level, the output of the column amplifier 22 is held in the capacitor element C_N. The output held at this time is a signal corresponding to the reset of the column amplifier 22, and the signal has the offset of the column amplifier 22 as a main component.

From the time t8, since the signal TX(n) temporarily turns to the high level, the charges accumulated in the photodiode PD are transferred to the gate node of the source follower transistor SF.

At the same time t8, the signal AD_N also turns to the high level, so that the signal held in the capacitor element C_N is supplied to the AD conversion unit 15 via the buffer unit 14. A period from the time t8 to the time t9 is the AD conversion period NAD(n) related to the pixel in the n-th row. The digital signal obtained during this period corresponds to the signal having the offset of the column amplifier 22 as the main component which is obtained by the operation from the time t7. Although not illustrated in the drawing, the switch for switching the connection state between the input node of the column amplifier 22 and the pixel output line 12 may be provided, and the column amplifier 22 may be electrically cut off from the pixel output line 12 during the period including the time t8 to the time t9. Accordingly, it is possible to avoid the situation where the potential fluctuation of the pixel output line 12 derived from the transition of the signal TX(n) is input to the column amplifier 22. Furthermore, in a case where the input node of the column amplifier 22 is temporarily electrically cut off from the pixel output line 12, if the conducting state of the above described switch is not to be switched during the AD conversion period NAD(n), it is possible to avoid the situation where the noise from the switching affects the AD conversion result. Accordingly, the accuracy of the AD conversion can be increased.

From the time t10, the signal SH_S temporarily turns to the high level, so that the signal output from the column amplifier 22 at this time is held in the capacitor element C_S. Specifically, the signal is a signal obtained by superposing the signal which corresponds to the charge amount transferred to the gate node of the source follower transistor SF by the operation from the time t8 and which is amplified by the column amplifier 22, on the signal obtained by the operation from the time t7.

At the time t11, when the signal AD_S turns to the high level, the AD conversion period SAD(n) related to the pixel in the n-th row starts.

At the time t12, the signal SEL(n) turns to the low level, and the selection transistor SEL of the pixel in the n-th row is turned off.

At a time t18, the signal RES(n) turns to the high level, and the gate node of the source follower transistor SF of the pixel in the n-th row is in a reset state.

The operation during the pixel reading period (n+1) that starts from the time t0' is similar to the operation during the pixel reading period (n), and therefore a description thereof will be omitted.

The digital signals obtained during the period NAD(n) and the period SAD(n) are subjected to differential processing by the data output unit 05, or the signal processing unit which is not illustrated and which is provided downstream of the data output unit 05. Accordingly, the correlated double sampling (CDS) processing for reducing the N signal is performed.

According to the present embodiment, similarly as in the first embodiment, it is possible to increase the signal reading speed.

In the present embodiment, the case in which the signal TX(n) or TX(n+1) is transited at the same time as the signal AD_N has been described, but the timing is not limited to this timing.

Third Embodiment

Figure 8:
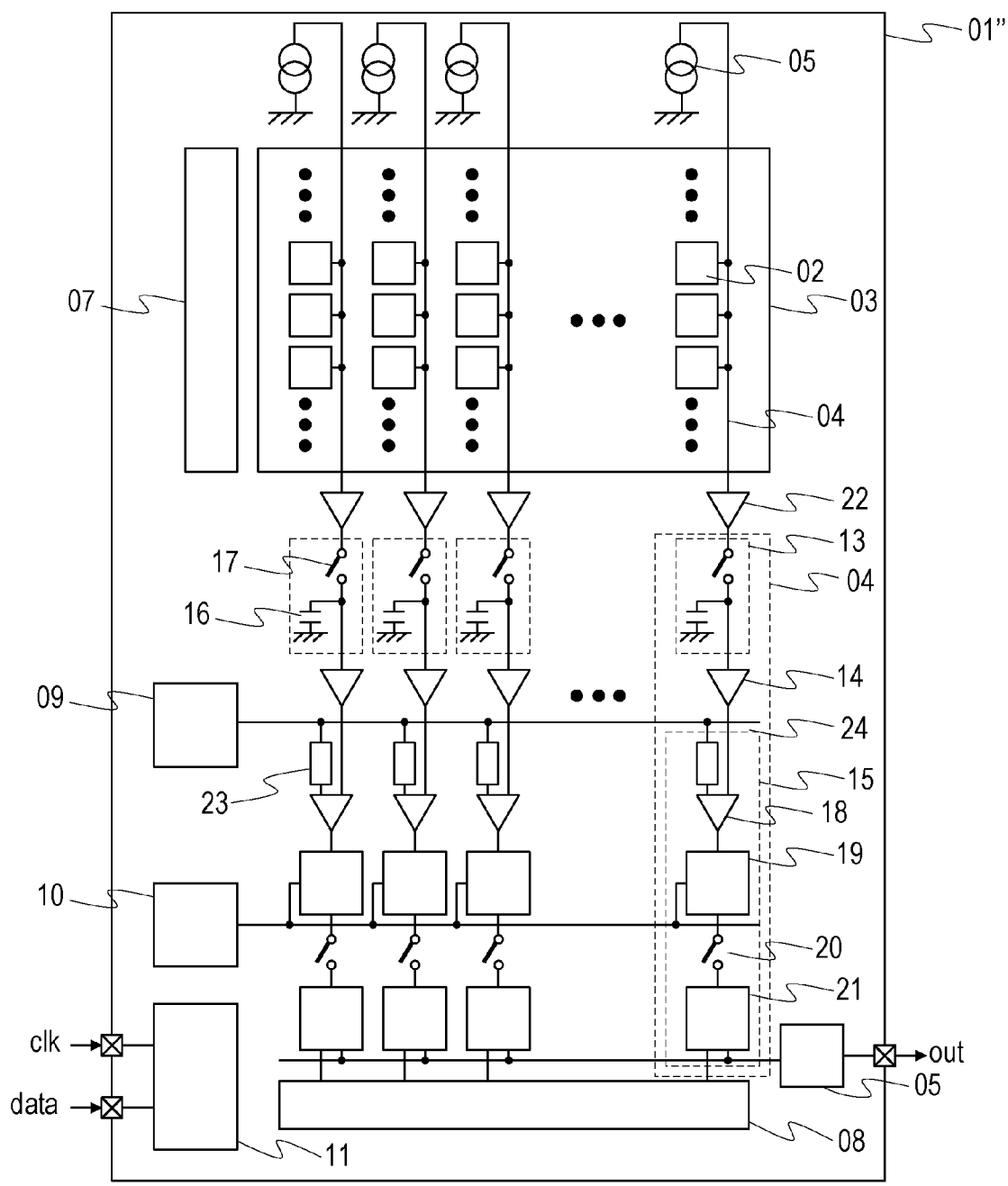
FIG. 8 is a block diagram illustrating a configuration of another photoelectric conversion apparatus.

FIG. 8 is a block diagram illustrating a configuration of a photoelectric conversion apparatus 01" according to the present embodiment. The difference from FIG. 1 resides in that reference signal buffer units 23 are added. Hereinafter, a description will be given while mainly focusing on the difference from FIG. 1.

According to the present embodiment, the reference signal supplied from the reference signal generation unit 09 is supplied to the comparison unit 18 via the reference signal buffer unit 23 provided in each column. The reference signal buffer unit 23 functions similarly to the buffer unit 14 and suppresses influences of the fluctuation of the output of the comparison unit 18 on a reference signal supply line 24. Since the reference signal supply line 24 is provided in common for the comparison units 18 in respective columns, it is possible to suppress the influence of the fluctuation of the output of the comparison unit 18 on other columns by providing the reference signal buffer units 23.

With the configuration according to the present embodiment, buffers are provided to both the inputs of the comparison unit 18, and therefore it is possible to suppress the influence of the fluctuation of the output of the comparison unit 18 on both the inputs, so that the comparison unit 18 can perform still more accurate comparison operation. When the buffer unit 14 and the reference signal buffer unit 23 are set to have the same circuit format, a gain with respect to the signal held in the sample-and-hold unit 13 can be matched with a gain with respect to the reference signal.

According to the present embodiment described above, the fixed pattern noise is reduced, and further it is possible to realize high-speed reading. Furthermore, the S/N ratio of the signal can be improved as compared to the first embodiment.

Fourth Embodiment

Figure 9:
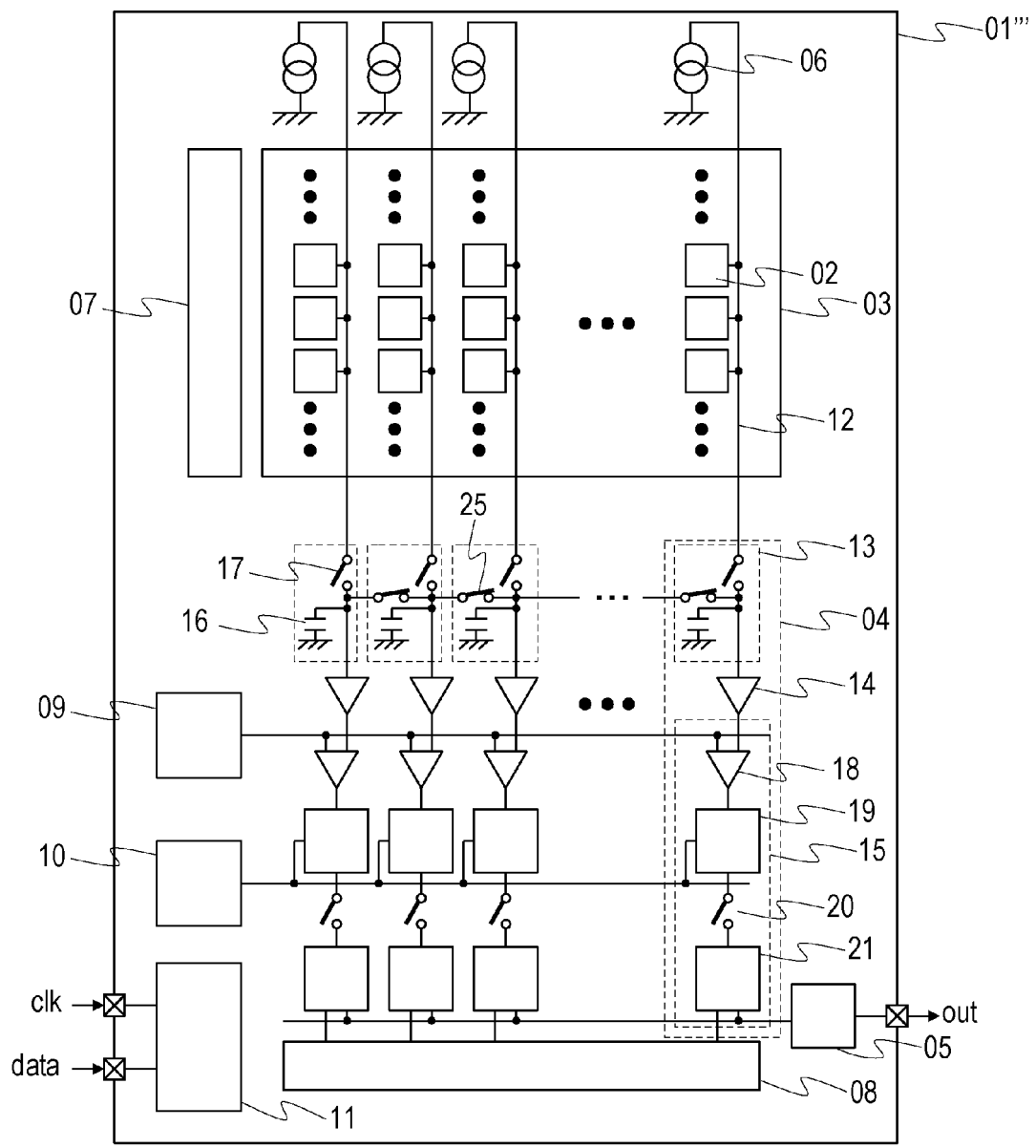
FIG. 9 is a block diagram illustrating a configuration of another photoelectric conversion apparatus.

FIG. 9 is a block diagram illustrating a configuration of a photoelectric conversion apparatus 01''' according to the present embodiment.

The difference from FIG. 1 resides in that switches 25 are further provided as connecting portions for mutually connecting the capacitor elements 16 provided to the column signal processing units 04 in different columns. According to the present embodiment, a configuration is adopted in which adjacent capacitor elements 16 in three columns are connected to each other. By turning the switch 25 on, signals based on a plurality of pixels can be averaged. The number of mutually connected capacitor elements is not limited to three, and the number is arbitrary selected as long as capacitor elements provided to the signal processing units in some columns among the signal processing units in a plurality of columns can be short-circuited mutually. In addition, capacitor elements to be connected are not limited to the capacitor elements in adjacent columns, and the switches 25 may be provided so that the capacitor elements 16 in every other column are connected to each other. For example, in the case of a photoelectric conversion apparatus provided with a Bayer color filter, signals based on pixels provided with color filters having a same color can be averaged.

Figure 10:
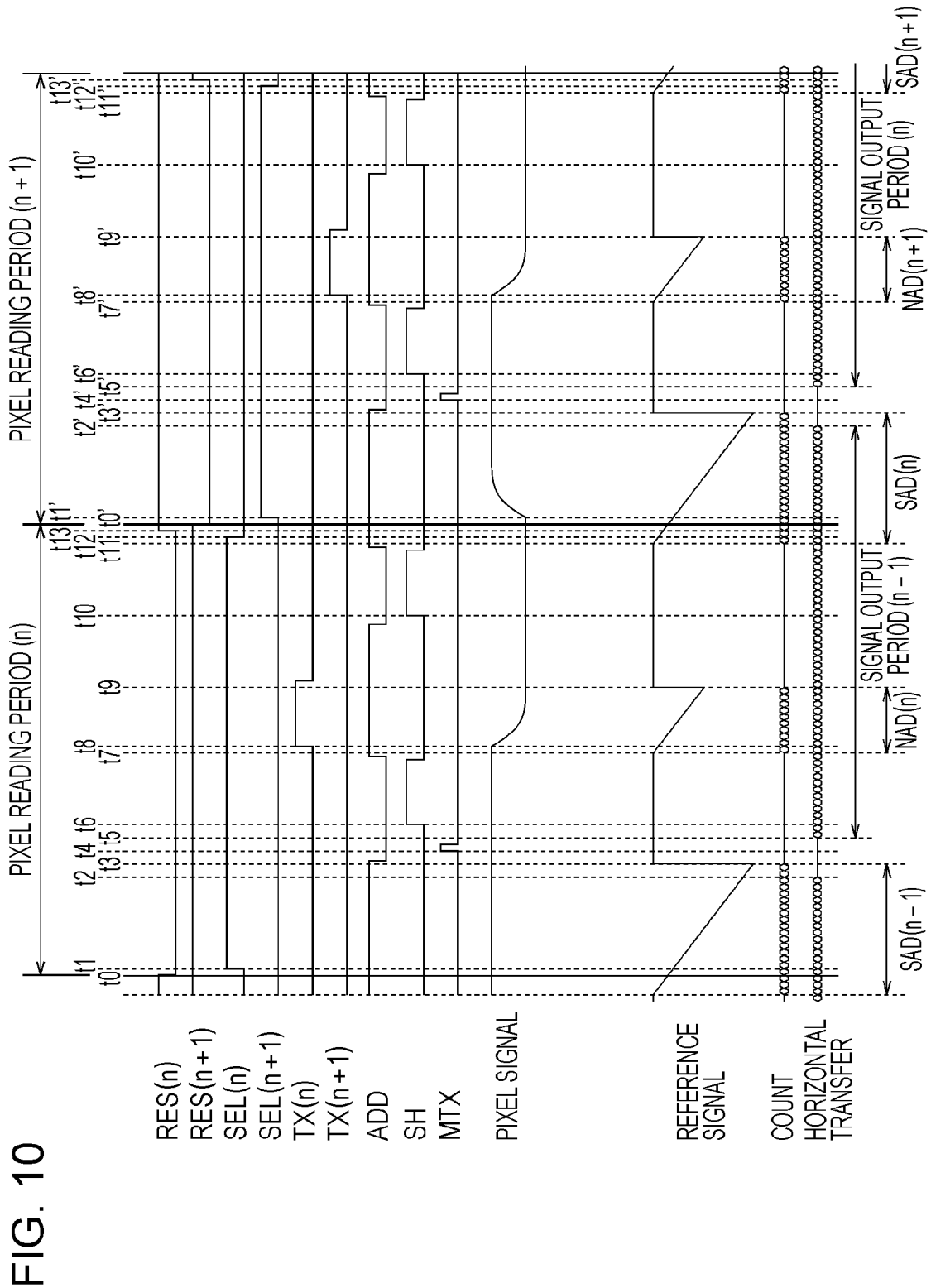
FIG. 10 is a timing chart for describing an operation by the photoelectric conversion apparatus.

FIG. 10 is a timing chart for describing an operation according to the present embodiment. The difference from FIG. 4 resides in that a signal ADD for controlling switching of a conducting state of the switch 25 is added. Hereinafter, the description will be given while focusing on the difference from the operation according to the timing chart illustrated in FIG. 4.

By the time t6, the signal ADD turns to the low level, and the capacitor elements 16 that have been mutually short-circuited up to that time are separated from each other.

During a period between the time t7 and the time t8, when the signal ADD turns to the high level, the switch 25 is turned on, and the capacitor elements 16 in the adjacent three columns are connected to a common node. Accordingly, the N signals based on the three pixels are averaged. The AD conversion of the averaged N signal is performed during the period NAD(n).

Thereafter, during a period between the time t9 and the time t10, the switch 25 is turned off by turning the signal ADD to the low level.

Thereafter, after the signal SH that has turned to the high level from the time t10 turns to the low level, the signal ADD again turns to the high level during a period until the time t11. Accordingly, S signals based on the three pixels are averaged. The AD conversion of the averaged S signal is performed during the period SAD(n).

Thereafter, from the time t4 to the time t7 during the pixel reading period (n+1), the signal ADD turns to the low level.

By the operation according to the present embodiment, the amount of data output during the signal output period can be decreased as compared to the first embodiment. According to the present embodiment, since signals in three columns are averaged, data from only one of the three adjacent columns may be output to the data output unit 05. Furthermore, with regard to the column signal processing units 04 in the columns from which data is not output, the buffer unit 14 and the AD conversion unit 15 may be switched to a power saving state.

According to the present embodiment described above, it is possible to further increase the reading speed. Furthermore, the S/N ratio of the signal can be improved as compared to the first embodiment.

Fifth Embodiment

Figure 11:
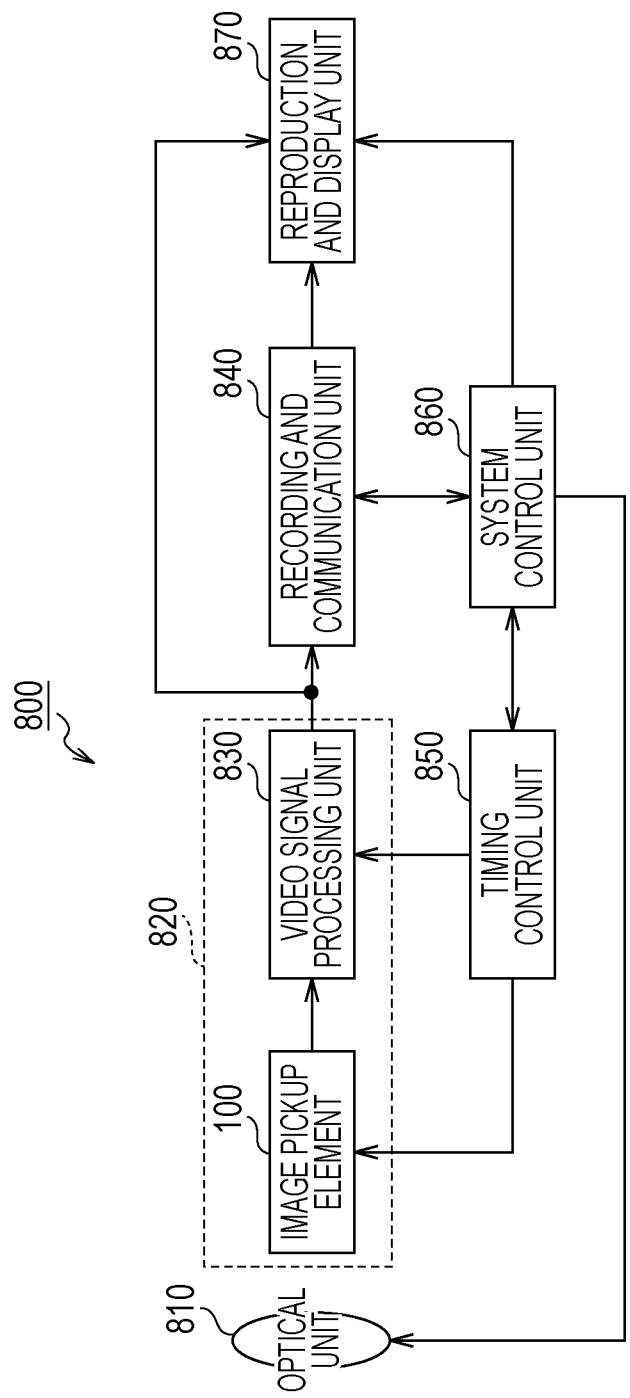
FIG. 11 is a block diagram illustrating a configuration of an image pickup system.

FIG. 11 illustrates a configuration of an image pickup system according to the present embodiment. The image pickup system 800 includes, for example, an optical unit 810, an image pickup element 100, a video signal processing unit 830, a recording and communication unit 840, a timing control unit 850, a system control unit 860, and a reproduction and display unit 870. An image pickup apparatus 820 includes the image pickup element 100 and the video signal processing unit 830. The photoelectric conversion apparatus according to any of the embodiments described above is used for the image pickup element 100.

The optical unit 810 functioning as an optical system such as a lens focuses light from a subject onto a pixel array 03, in which a plurality of pixels of the image pickup element 100 are two-dimensionally arranged, and forms an image of the subject. The image pickup element 100 outputs a signal in accordance with the light focused on the pixel array 03 at a timing based on a signal from the timing control unit 850. The signal output from the image pickup element 100 is input to the video signal processing unit 830 functioning as a video signal processing unit, and the video signal processing unit 830 performs signal processing in accordance with a method set by a program or the like. A signal obtained by the processing in the video signal processing unit 830 is transmitted to the recording and communication unit 840 as image data. The recording and communication unit 840 transmits the signal for forming the image to the reproduction and display unit 870 and causes the reproduction and display unit 870 to reproduce and display a moving image or a still image. The recording and communication unit 840 further receives the signal from the video signal processing unit 830 to perform communication with the system control unit 860 and also performs an operation for recording the signal for forming the image in a recording medium that is not illustrated.

The system control unit 860 is configured to control the operation of the image pickup system and controls drive of the optical unit 810, the timing control unit 850, the recording and communication unit 840, and the reproduction and display unit 870. In addition, the system control unit 860 is provided, for example, with a storage device (not illustrated) such as a recording medium, and the program, or the like, to be used for controlling the operation of the image pickup system is recorded in this storage device. The system control unit 860 also supplies to the image pickup system a signal for switching a drive mode in accordance with, for example, an operation by a user. A few examples of drive modes include, changing a reading row or a row to be reset, changing a field angle accompanied by electronic zooming, and shifting the field angle based on an electronic image stabilizing function. The timing control unit 850 controls driving timings of the image pickup element 100 and the video signal processing unit 830 on the basis of the control performed by the system control unit 860.

Others

The embodiments described above are intended as examples for carrying out the present invention and are not limited to these configurations. Furthermore, the items specifically described in the respective embodiments can be used in combination without departing from the gist of the present invention.

For example, a voltage follower circuit or a source follower circuit can be applied as a specific configuration of the buffer unit 14, and it is also possible to use the inverting amplifier as illustrated in FIG. 3, an amplifier that can set an amplification factor exceeding 1, and further, an amplifier in which the amplitude factor is variable. By applying the amplifier having the configuration illustrated in FIG. 3 to the buffer unit 14, it is possible to enhance the effect of suppressing the fixed pattern noise. This is because, since an output impedance of the differential amplifier OP is small and also the signal is held in the capacitor element whose one end is supplied with a fixed voltage, even if the influence of the change of the output of the comparison unit 18 propagates to the input capacitance Cin via the feedback capacitance Cf, this influence can be suppressed.

In addition, by preparing a line for supplying the fixed voltage to one node of the capacitor element included in the sample-and-hold unit 13 separately from a line for supplying the fixed voltage to a circuit arranged in the vicinity of the capacitor element, it is possible to reduce the influence when the output of the comparison unit 18 changes. Specifically, GND of the capacitor element and GND of the comparison unit 18 are supplied by mutually different lines.

The capacitor element included in the sample-and-hold unit 13 can also be formed in a different well region on a same semiconductor substrate where circuits arranged in the vicinity of the capacitor element are formed in a certain well region. Specifically, the capacitor element and the comparison unit 18 are formed in mutually different well regions. Accordingly, it is possible to reduce the influence when the output of the comparison unit 18 changes. In addition, the capacitor element included in the sample-and-hold unit 13 may be formed in a well region different from the region where the pixel array and the column amplifier are formed, on the same semiconductor substrate. With this configuration, contamination of noise from the pixel and the column amplifier can be suppressed during the period in which the capacitor element holds the signal.

Moreover, the count unit 10 may be configured such that the count unit 10 is individually provided to each of the plurality of comparison units 18. In this case, each count unit also functions as the write memory 19 in FIG. 1. Furthermore, in a case where the count units 10 are individually provided to the respective comparison units 18, the count unit 10 may take a configuration where an up-count operation in which a count value increments and a down-count operation in which the count value decrements can be switched. According to this configuration, by switching the operations between the period NAD(n) and the period SAD(n), the digital signal in which the noise component is reduced can be held in the respective count units.

According to the present invention, it is possible to increase the signal reading speed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-261505, filed Dec. 18, 2013, which is hereby incorporated by reference herein in its entirety.

What is claimed is:

1. A driving method for a photoelectric conversion apparatus that includes
   a pixel array in which a plurality of pixels are arranged in a matrix, each of the pixels including a photoelectric conversion unit, and
   a plurality of column signal processing units provided in correspondence with respective columns of the pixel array,
   each column signal processing unit including
   an amplification unit configured to amplify a signal output from the pixel, a hold unit configured to hold a signal output from the amplification unit, and
   a plurality of buffer units provided in correspondence with respective columns of the pixel array,
   the method comprising:
   first processing of causing, in a case where signals are sequentially read out from the pixels in first and second rows included in the pixel array, the hold unit to hold a first signal output from the amplification unit based on a situation where the amplification unit is reset;
   second processing of performing AD conversion of the first signal after the first processing and outputting a second signal that is obtained by superposing a signal based on charges generated in the photoelectric conversion unit of the pixel in the first row on the first signal from the amplification unit;
   third processing of performing an operation of performing, after the second signal is held in the hold unit, AD conversion of the second signal and an operation of resetting the amplification unit after the second signal is output from the amplification unit, at least partly in parallel; and
   fourth processing of causing the hold unit to hold a fourth signal that is obtained by superposing a signal based on charges generated in the photoelectric conversion unit of the pixel in the second row on a third signal output from the amplification unit based on a situation where the amplification unit is reset in the third processing and is output from the amplification unit,
   wherein the AD conversion of the first to fourth signals supplied from the buffer unit is performed.

2. The method according to claim 1,
   wherein the amplification unit includes a differential amplifier, and
   wherein the amplification unit is reset by short-circuiting an inversion input node and an output node of the differential amplifier.

3. The method apparatus according to claim 2, wherein the amplification unit includes an input capacitance having one of nodes being connected to the pixel and the other node being connected to the inversion input node, and a feedback capacitance having one of nodes being connected to the inversion input node of the differential amplifier and the other node being connected to the output node of the differential amplifier.

4. An image pickup system comprising:
   the photoelectric conversion apparatus according to claim 1; and
   a signal processing unit configured to generate image data by processing a signal output by the photoelectric conversion apparatus.

5. The driving method according to claim 1,
   wherein the operation of resetting the amplification unit in the third processing performed in at least a part of the period in which holding the fourth signal by the holding unit in the fourth processing is performed.

6. The driving method according to claim 1, wherein the photoelectric conversion apparatus further includes a signal line,
   wherein each column signal processing unit further includes a first memory and a second memory, the first memory being able to connect to the second memory, wherein
   the second memory of each of the plurality of column signal processing units is able to connect to the signal line, and
   wherein the operation of resetting the amplification unit is performed in at least a part of a period of transferring a digital signal generated by the AD conversion of the first signal in the second processing, from the first memory to the second memory.

7. The method according to claim 1,
   wherein the amplification unit includes a differential amplifier, and
   wherein the amplification unit is reset by short-circuiting an input node and an output node of the differential amplifier.

8. The method according to claim 5,
   wherein the amplification unit includes a differential amplifier, and
   wherein the amplification unit is reset by short-circuiting an input node and an output node of the differential amplifier.

9. The apparatus according to claim 6,
wherein the amplification unit includes a differential amplifier, and
wherein the amplification unit is reset by short-circuiting an input node and an output node of the differential amplifier.

10. The method according to claim 5,
wherein the photoelectric conversion apparatus further includes a signal line,
wherein each column signal line further includes an AD conversion unit including a first memory and a second memory,
wherein the method further comprises
holding a digital signal based on the amplified signal, the digital signal being generated by the AD conversion,
transferring the digital signal from the first memory to the second memory, and
transferring the digital signal from the second memory of each of the plurality of column signal processing units to the signal line,
wherein
at least a part of a period of the performing the AD conversion and at least a part of a period of the performing resetting the amplification unit overlap.

11. The method according to claim 1,
wherein, in the second processing, the hold unit generates a first summed signal by adding signals output respectively from the pixels of the columns in the first row together;
wherein, in the third processing, AD conversion of the first summed signal is performed; and
wherein a period during which the hold unit generates the first summed signal and at least a part of a period during which the amplification unit is reset in the fourth processing overlap.

12. The method according to claim 1,
wherein, in the second processing, the hold unit generates a first summed signal by adding signals output respectively from the pixels of the columns in the first row together;
wherein, in the third processing, AD conversion of the first summed signal is performed; and
wherein a period during which the hold unit generates the first summed signal and at least a part of a period during which the amplification unit is reset in the fourth processing overlap.

13. A driving method for a photoelectric conversion apparatus that includes
a pixel array in which a plurality of pixels are arranged in a matrix, each of the pixels including a photoelectric conversion unit, and
a plurality of column signal processing units provided in correspondence with respective columns of the pixel array,
each column signal processing unit including
an amplification unit including a differential amplifier, and configured to amplify a signal output from the pixel, and
a hold unit configured to hold a signal output from the amplification unit,
the method comprising:
first processing of causing, in a case where signals are sequentially read out from the pixels in first and second rows included in the pixel array, the hold unit to hold a first signal output from the amplification unit based on a situation where the amplification unit is reset;
second processing of performing AD conversion of the first signal after the first processing and outputting a second signal that is obtained by superposing a signal based on charges generated in the photoelectric conversion unit of the pixel in the first row on the first signal from the amplification unit;
third processing of performing an operation of performing, after the second signal is held in the hold unit, AD conversion of the second signal and an operation of resetting the amplification unit after the second signal is output from the amplification unit, at least partly in parallel; and
fourth processing of causing the hold unit to hold a fourth signal that is obtained by superposing a signal based on charges generated in the photoelectric conversion unit of the pixel in the second row on a third signal output from the amplification unit based on a situation where the amplification unit is reset in the third processing and is output from the amplification unit,
wherein the amplification unit is reset by short-circuiting an inversion input node and an output node of the differential amplifier.

14. The method according to claim 13, wherein the amplification unit includes an input capacitance having one of nodes being connected to the pixel and the other node being connected to the inversion input node, and a feedback capacitance having one of nodes being connected to the inversion input node of the differential amplifier and the other node being connected to the output node of the differential amplifier.

15. A driving method for a photoelectric conversion apparatus that includes
a pixel array in which a plurality of pixels are arranged in rows and columns, each of the pixels including a photoelectric conversion unit,
a plurality of amplification units provided in correspondence with respective columns of the pixel array, and each configured to generate an amplified signal by amplifying a signal output from the pixel,
a hold unit configured to hold the amplified signal output from the amplification unit,
a signal line, and
a column signal processing unit including an AD conversion unit having a first memory and a second memory,
the method comprising:
generating the amplified signal by the amplification unit, performing an AD conversion of the amplified signal and performing resetting the amplification unit,
wherein at least a part of a period of the performing the AD conversion and at least a part of a period of the performing resetting the amplification unit overlap,
the method further includes:
first processing of causing, in a case where signals are sequentially read out from the pixels in first and second rows included in the pixel array, the hold unit to hold a first signal output from the amplification unit based on a situation where the amplification unit is reset;
second processing of performing AD conversion of the first signal after the first processing and outputting a second signal that is obtained by superposing a signal based on charges generated in the photoelectric conversion unit of the pixel in the first row on the first signal from the amplification unit;
third processing of performing an operation of performing, after the second signal is held in the hold unit; and
fourth processing of causing the hold unit to hold a fourth signal that is obtained by superposing a signal based on charges generated in the photoelectric conversion unit of the pixel in the second row on a third signal output from the amplification unit based on a situation where the amplification unit is reset in the third processing and is output from the amplification unit, wherein the method further comprises holding a digital signal based on the amplified signal, the digital signal being generated by the AD conversion, transferring the digital signal from the first memory to the second memory, and transferring the digital signal from the second memory of each of the plurality of column signal processing units to the signal line, wherein at least a part of a period of the performing the AD conversion and at least a part of a period of the performing resetting the amplification unit overlap.

16. The method according to claim 15, further including a plurality of buffer units provided in correspondence with respective columns of the pixel array, wherein AD conversion of the first to fourth signals supplied from the buffer unit is performed.

17. The method according to claim 15, wherein, in the second processing, the hold unit generates a first summed signal by adding signals output respectively from the pixels of the columns in the first row together;

wherein, in the third processing, AD conversion of the first summed signal is performed; and wherein a period during which the hold unit generates the first summed signal and at least a part of a period during which the amplification unit is reset in the fourth processing overlap.

* * * * *